US012210390B2

(12) United States Patent
Reber et al.

(10) Patent No.: US 12,210,390 B2
(45) Date of Patent: Jan. 28, 2025

(54) MOUNTING SYSTEMS FOR COMPUTING DEVICE INPUT ASSEMBLIES

(71) Applicant: ZEBRA TECHNOLOGIES CORPORATION, Lincolnshire, IL (US)

(72) Inventors: David William Reber, Cedar Park, TX (US); Lawrence Allen Stone, Austin, TX (US); Zichun Song, Cedar Park, TX (US)

(73) Assignee: Zebra Technologies Corporation, Lincolnshire, IL (US)

( * ) Notice: Subject to any disclaimer, the term of this patent is extended or adjusted under 35 U.S.C. 154(b) by 22 days.

(21) Appl. No.: 18/115,235

(22) Filed: Feb. 28, 2023

(65) Prior Publication Data
US 2024/0288909 A1   Aug. 29, 2024

(51) Int. Cl.
*G06F 1/16*   (2006.01)
(52) U.S. Cl.
CPC ................................. *G06F 1/1669* (2013.01)
(58) Field of Classification Search
CPC ..... G06F 1/1667; G06F 1/1671; G06F 1/1669
USPC .................................................... 361/679.41
See application file for complete search history.

(56) References Cited

U.S. PATENT DOCUMENTS

| 6,532,152 | B1* | 3/2003 | White | G06F 1/1656 |
| | | | | 312/223.1 |
| 7,234,739 | B2* | 6/2007 | Saitoh | E05C 19/163 |
| | | | | 292/251.5 |
| 2014/0177162 | A1* | 6/2014 | Ho | G06F 1/1654 |
| | | | | 361/679.41 |
| 2015/0268696 | A1* | 9/2015 | Wu | G06F 1/1669 |
| | | | | 361/679.43 |
| 2017/0285693 | A1* | 10/2017 | Mori | G06F 1/1669 |
| 2023/0026242 | A1* | 1/2023 | Chang | G06F 1/1662 |

FOREIGN PATENT DOCUMENTS

EP              1653327 A2 *   5/2006   ........... G06F 1/1632

* cited by examiner

*Primary Examiner* — Daniel C Puentes
*Assistant Examiner* — Peter Krim (57) ABSTRACT

An input assembly for a computing device includes: an input device; a mounting body coupled to the input device; a blade member affixed to the mounting body, the blade member configured for insertion into a slot of the computing device, wherein the slot includes a transverse recess; a latch disposed within the blade member, the latch having a head carrying a magnet, the latch coupled to the mounting body movably between (i) an engaged position to place the head in the recess and obstruct withdrawal of the latch from the slot, and (ii) a retracted position to withdraw the head from the recess; and wherein the latch is biased towards the engaged position via attraction between the magnet and a magnetic material of the transverse recess.

21 Claims, 9 Drawing Sheets

MOUNTING SYSTEMS FOR COMPUTING DEVICE INPUT ASSEMBLIES

BACKGROUND

Certain computing devices, such as tablet computers, can be coupled with removable peripherals such as keyboards, keypads, or the like. Various mechanisms can be employed for mounting a peripheral to a tablet computer, such as mounting plates with screws, or the like. The mounting mechanisms may be subject to competing constraints. For example, a mounting mechanism selected for ease of mounting and removal of the peripheral with the tablet computer may be prone to accidental removal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an input assembly for a computing device, the input assembly comprising: an input device; a mounting body coupled to the input device; a blade member affixed to the mounting body, the blade member configured for insertion into a slot of the computing device, wherein the slot includes a transverse recess; a latch disposed within the blade member, the latch having a head carrying a magnet, the latch coupled to the mounting body movably between (i) an engaged position to place the head in the recess and obstruct withdrawal of the latch from the slot, and (ii) a retracted position to withdraw the head from the recess; and wherein the latch is biased towards the engaged position via attraction between the magnet and a magnetic material of the transverse recess.

Additional examples disclosed herein are directed to a system, comprising: a computing device including a housing, the housing defining a slot extending from an outer wall of the housing into the housing, the slot containing a transverse recess; an input assembly; a mounting body coupled to the input assembly; a blade member affixed to the mounting body, the blade member configured for insertion into the slot; a latch disposed within the blade member, the latch having a head carrying a magnet, the latch coupled to the mounting body movably between (i) an engaged position to place the head in the recess and obstruct withdrawal of the latch from the slot, and (ii) a retracted position to withdraw the head from the recess; and wherein the latch is biased towards the engaged position via attraction between the magnet and a magnetic material of the transverse recess.

Figure 1:
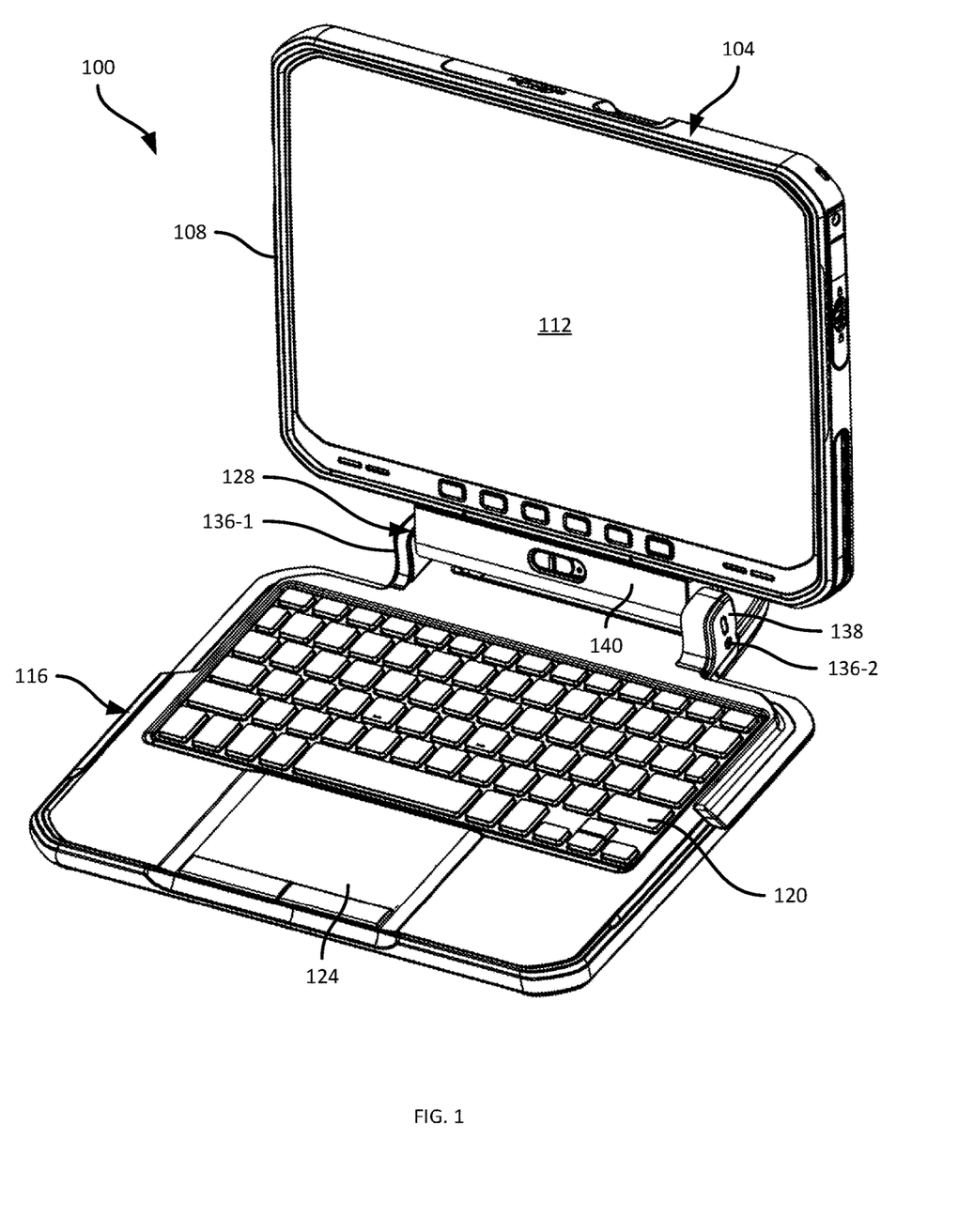
FIG. 1 is a diagram of a system for coupling a computing device and an input assembly.

FIG. 1 illustrates a system 100 including a computing device 104, such as a tablet computer. The computing device 104 includes a housing 108 supporting various other components of the computing device 104, such as a display 112. The system 100 also includes an input assembly 116 carrying an input device such as a keyboard 120 with a touch pad 124. The computing device 104 and the input assembly 116 can be coupled together, e.g., removably, to extend the range of input capabilities available to the computing device 104 (which otherwise lacks a keyboard). The input assembly 116 can also implement a wide variety of other input capabilities in addition to or instead of those provided by a keyboard.

The system 100 also includes a mounting mechanism 128 configured to removably couple the computing device 104 with the input assembly 116. In the illustrated example, the mounting mechanism 128 is affixed to the input assembly 116, e.g., via connectors such as mounting plates fastened to the keyboard 120. The mounting plates 132 can be rotatably supported on the mounting mechanism 128 via respective axles 136-1 and 136-2 extending from opposite ends of a mounting body 140 of the mechanism 128. Either or both of the axles 136 can incorporate friction hinges, e.g., to maintain a selected angle (e.g., by an operator of the computing device 104) between the keyboard 120 and the computing device 104. In some examples, the mounting mechanism 128 can include a locking assembly, discussed further below, for preventing disengagement of the input assembly 116 from the computing device 104. The locking assembly of the mounting mechanism 128 can be enclosed in a portion 138 of a housing of the input assembly 116.

The mounting mechanism 128 and the input assembly 116, in other words, can be removably coupled to the computing device 104, permitting the computing device 104 to be operated in a tablet-only mode (e.g., without a hardware keyboard) when disconnected from the input assembly 116, or in a laptop mode when connected with the input assembly 116. As discussed below, the mounting mechanism 128 includes various structural features that facilitate the coupling and uncoupling of the computing device 104 to the input assembly 116, while also mitigating the likelihood of accidental uncoupling and providing clear sensory feedback to an operator when the computing device 104 engages with the mounting mechanism 128.

Figure 2:
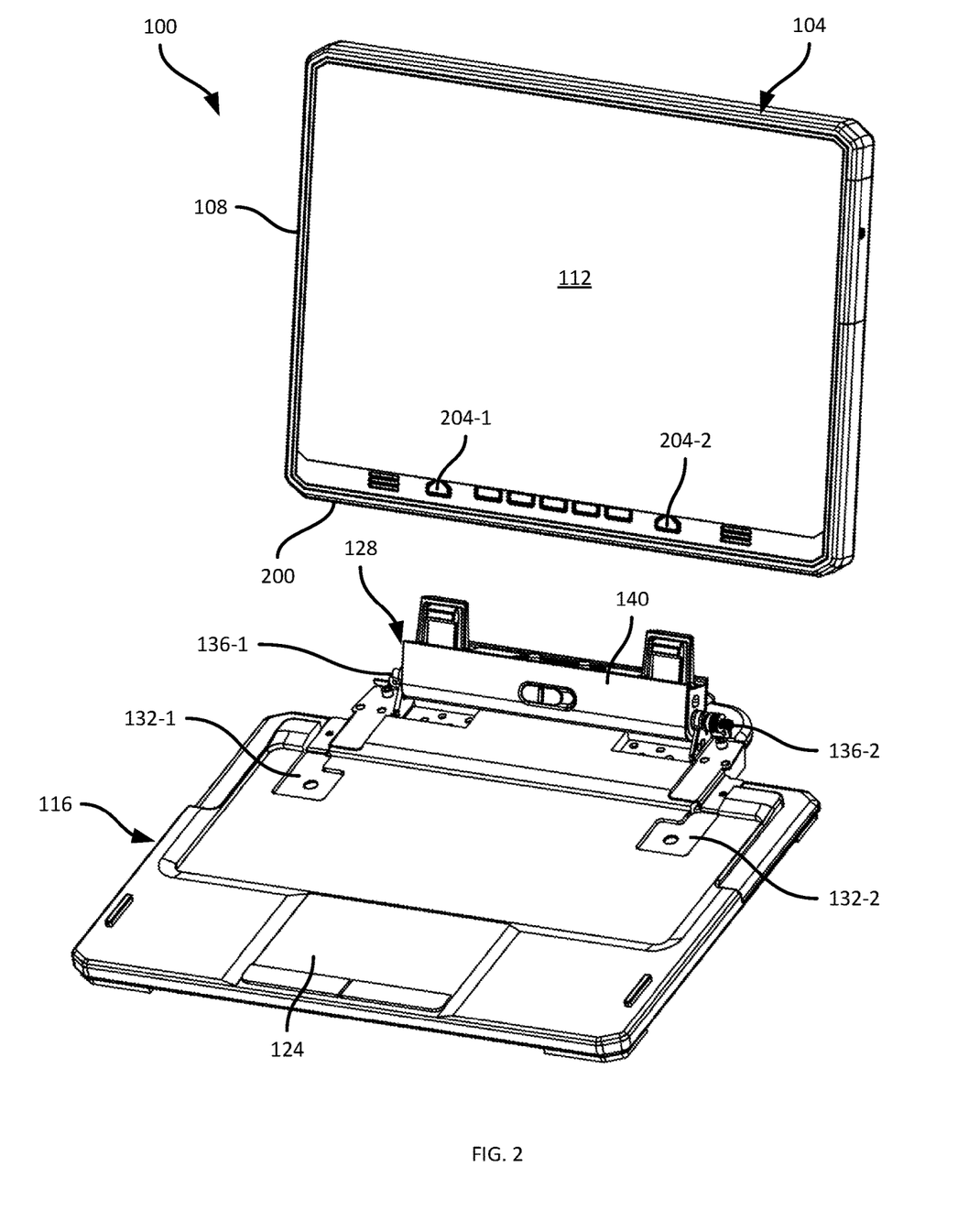
FIG. 2 is a diagram of the system of FIG. 1, with the computing device and the input assembly decoupled.

FIG. 2 illustrates the input assembly 116 in a disengaged or uncoupled configuration with another example computing device 104. They keyboard 120 is omitted in FIG. 2 to reveal mounting plates 132-1 and 132-2 connecting a base of the keyboard 120 to the mounting mechanism 128. As seen in FIG. 2, removal of the computing device 104 from the mounting mechanism 128 leaves the mounting mechanism 128 and the input assembly 116 affixed to one another (e.g., via the plates 132 and axles 136). The computing device 104, in this example, includes certain structural features along a bottom wall 200 of the housing 108 that enable the computing device 104 to engage with the mounting mechanism 128.

In the embodiment illustrated in FIG. 2, the computing device 104 can include buttons 204-1 and 204-2 disposed on a front wall of the housing 108 (e.g., the wall supporting the display 112). As discussed below, in some examples, the buttons 204 can be actuated, e.g., by an operator of the computing device 104, to decouple the computing device 104 from the mounting mechanism 128. In other examples (as shown in FIG. 1), the buttons 204 can be omitted.

Figure 3A:
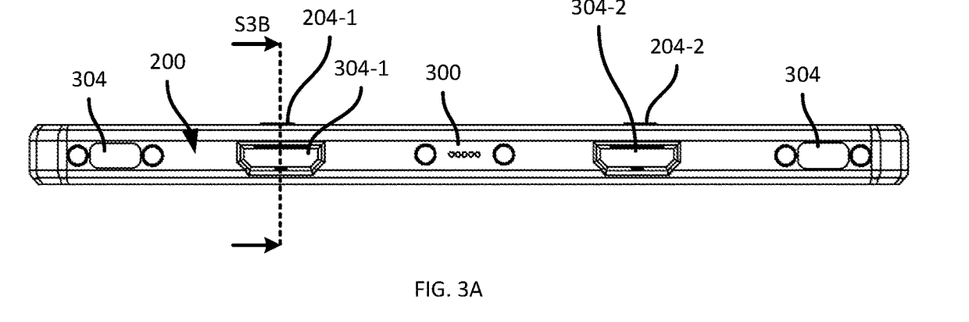
FIG. 3A is a bottom view of the computing device of FIG. 2.

FIG. 3A is a bottom view of the computing device 104, illustrating certain features of the bottom wall 200 of the housing 108. The bottom wall includes a port 300, having a set of electrical contacts configured to engage with corresponding contacts of the mounting mechanism 128 to relay data between the input assembly 116 and the computing device 104. In the present example, the port 300 includes a set of pogo pin contacts, and optionally alignment apertures on either side of the pogo pin contacts. The port 300 can also take a wide variety of other forms in other embodiments, however. In some examples, the bottom wall 200 can include further ports 300, although the ports 300 in this example do not interact with the mounting mechanism 128 and can also be omitted.

The bottom wall 200 further includes at least one slot extending from the bottom wall 200 into the housing 108 of the computing device 104. In the present example, the computing device 104 includes a first slot 304-1, and a second slot 304-2, each configured to accommodate respective components of the mounting mechanism 128. In other examples, the bottom wall 200 can include a single slot 304, or more than two slots 304, and the mounting mechanism 128 can include corresponding numbers of the components configured to mate with the slots 304 (discussed below).

Figure 3B:
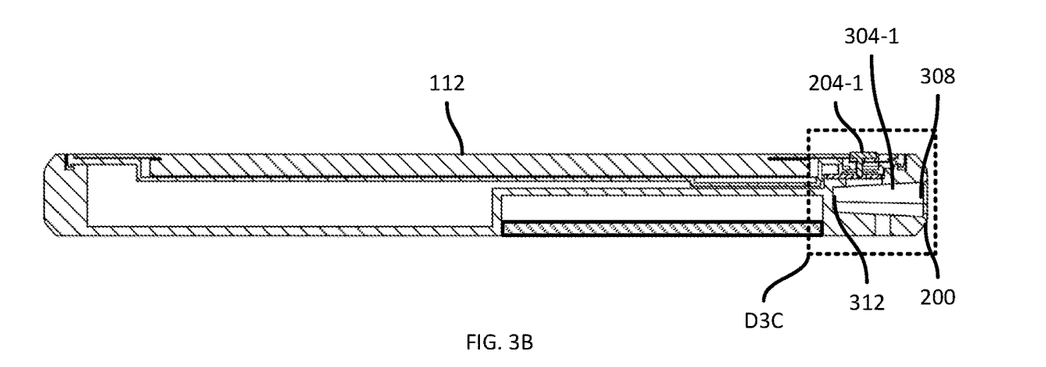
FIG. 3B is a cross section of the computing device of FIG. 3A, taken at the section line "S3B" in FIG. 3A.

FIG. 3B illustrates a cross section of the computing device 104, taken at the section line S3B shown in FIG. 3A. Internal components of the computing device 104 are omitted for simplicity, and the housing 108 is therefore illustrated with empty compartments behind the display 112, e.g., for containing circuit boards, transceivers, a rechargeable battery, and the like. Further, the slot 304-1 is shown extending from an open end 308 at the bottom wall 200 into the housing 108, to a closed end 312. The slots 304 can both have the same internal structure as the slot 304-1 shown in FIG. 3B.

The slot 304-1 (and the slot 304-2) can have a wedge shape, in that the area of the open end 308 is larger than the area of the closed end 312. The slots 304 can therefore taper from the opening at the bottom wall 200 to the closed end 312 within the housing 108. The slot 304 can also, in some examples, taper both in width and length, facilitating alignment of certain components of the mounting mechanism 128 with the slots 304.

Figure 3C:
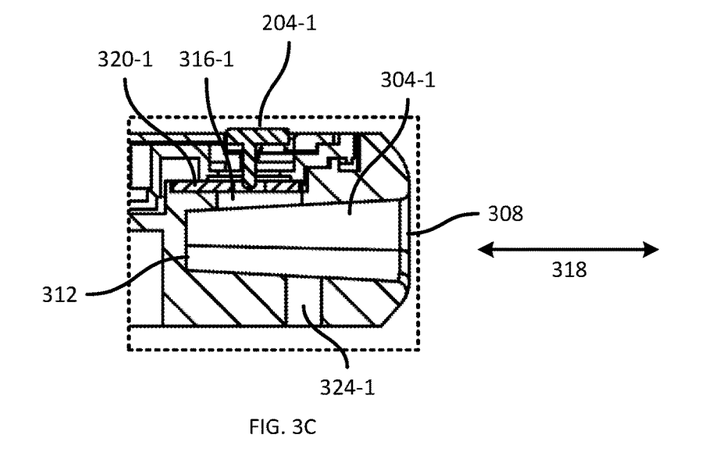
FIG. 3C is a detailed view of the portion "D3C" of the cross section of FIG. 3B.

FIG. 3C is a detailed diagram of the portion of the computing device 104 labelled D3C in FIG. 3B. As shown in FIG. 3C, the slot 304-1 also includes a transverse recess 316-1 extending towards the display 112. More generally, the transverse recess 316 of each slot 304 extends away from the main channel of the slot 304, e.g., crosswise to a longitudinal direction 318 in which the computing device 104 engages and disengages with the mounting mechanism 128. As discussed below, the mounting mechanism 128 includes components that, in response to insertion in the slot 304, engage the recess 316-1 and obstruct removal of those components from the slot 304. The computing device 104 also includes a magnetic material, e.g., in the form of a plate 320-1 of ferromagnetic or other suitable material, at an end of the recess 316.

The button 204-1, as shown in FIG. 3C, includes an extension into the housing 108. When the button 204-1 is depressed inwards (e.g., towards the recess 316-1), the extension protrudes into the recess 316-1, e.g., via an opening in the plate 320-1, to engage with components of the mounting mechanism 128. The computing device 104 can also include, in this example, an aperture 324-1 in a back wall of the housing 108 and in communication with the interior of the slot 304. The aperture 324 permits, as discussed further below, the computing device 104 and the mounting mechanism 128 to be locked together.

Figure 4:
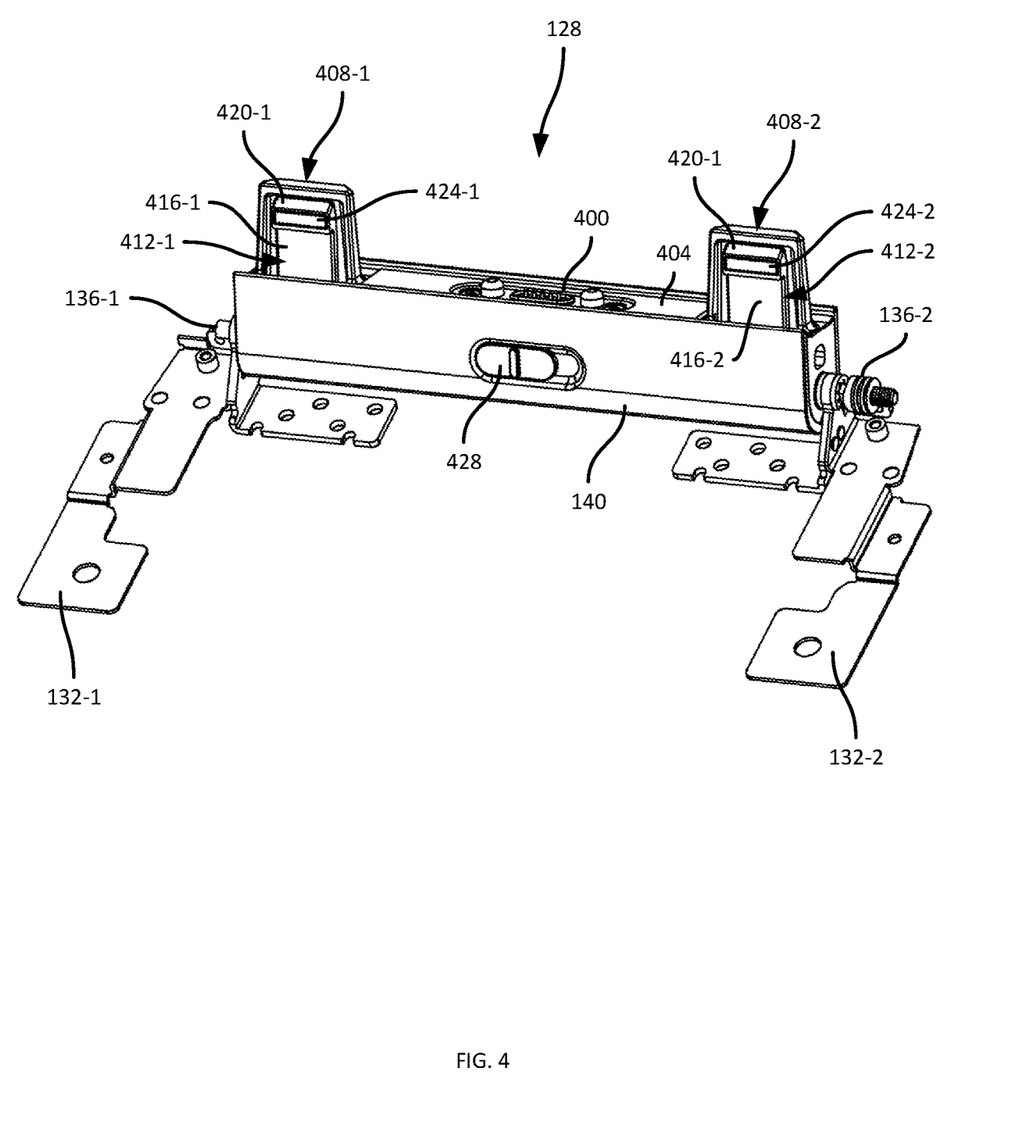
FIG. 4 is a diagram illustrating a mounting mechanism of the system of FIG. 1 in isolation.

Turning to FIG. 4, the mounting mechanism 128 is shown in isolation. As shown in FIG. 4, the mounting mechanism 128 includes a port 400 on a wall 404 thereof configured to engage with the port 300 of the computing device 104 shown in FIG. 3A. The port 400 includes, in this example, a set of pogo pins and adjacent alignment posts. The specific structure of the port 400 can vary according to the nature of the port 300, however.

The mounting mechanism 128 also includes, extending outwards from the wall 404, at least one blade member. In the illustrated example, the mounting mechanism 128 includes two blade members 408-1 and 408-2. In other examples, the mounting mechanism 128 can include as few as one blade member 408, or more than two blade members 408. The number of blade members 408 included in the mounting mechanism 128 corresponds to the number of slots 304 on the bottom wall 200 of the computing device 104. Each blade member 408 is configured for insertion into a corresponding slot 304. That is, the blade member 408-1 is configured for insertion into the slot 304-1, and the blade member 408-2 is configured for insertion into the slot 304-2. The blade members 408 are shaped to substantially press-fit into the slots 304, to reduce or eliminate play between the blade members 408 and the walls of the slots 304 (and thus reduce or eliminate play between the computing device 104 and the input assembly 116). The blade members 408 can therefore be tapered similarly to the slots 304, being larger at a base or proximal end affixed to the mounting body 140, and smaller at an opposing distal end.

The mounting mechanism 128 also includes a latch disposed within each blade member 408. In the illustrated example, the mounting mechanism 128 includes a first latch 412-1 disposed within the blade member 408-1, and a second latch 412-2 disposed within the blade member 408-2. The latches 412 need not be enclosed within the blade members 408. As illustrated, the latches 412 can be substantially exposed, while remaining encapsulated within the outer boundaries of the blade members 408, as will be discussed further below in connection with FIGS. 5A and 5B.

The latches 412 each include a latch body 416-1, 416-2 extending from an interior of the mounting body 140 within the corresponding blade member 408. Each latch 412 also includes a head 420-1, 420-2 at the end of the body 416. The head 420 carries a magnet 424-1, 424-2. The latches 412 are movable relative to the mounting body 140 and the blade members 408, between an engaged position and a retracted position. The magnets 424 are configured to engage with the plates 320 within the recesses 316. As a blade member 408 and a corresponding latch 412 are inserted into a slot 304, attraction between the magnet 424 and the plate 320 within the slot 304 biases the latch 412 towards the engaged position, in which the head 420 extends into the recess 316 and the magnet 424 contacts the plate 320. Contact between the plate 320 and the magnet 424 can generate an audible "click" sound, providing sensory feedback that the blade member 408 has been fully inserted in the slot 304 and the computing device 104 is therefore correctly coupled with the input assembly 116. Further, extension of the head 420 into the transverse recess 316 obstructs removal of the latch 412 from the slot 304, therefore keeping the mounting mechanism 128 coupled to the computing device 104.

The mounting mechanism also includes, in the illustrated example, an actuator configured to move the latches 412 between the positions mentioned above. The actuator is housed within the mounting body 140, and can be operated via a slider 428 movably disposed on the exterior of the mounting body 140.

Figure 5A:
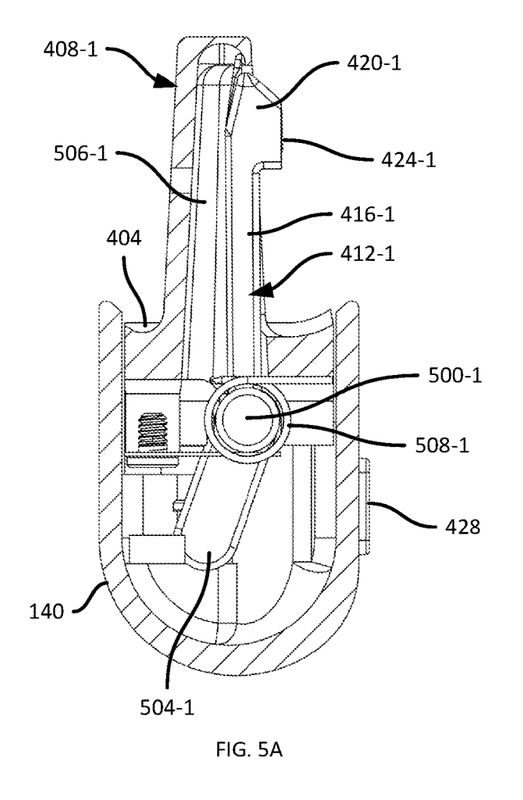
FIG. 5A is a cross section of the mounting mechanism of FIG. 4 in an engaged position.
Figure 5B:
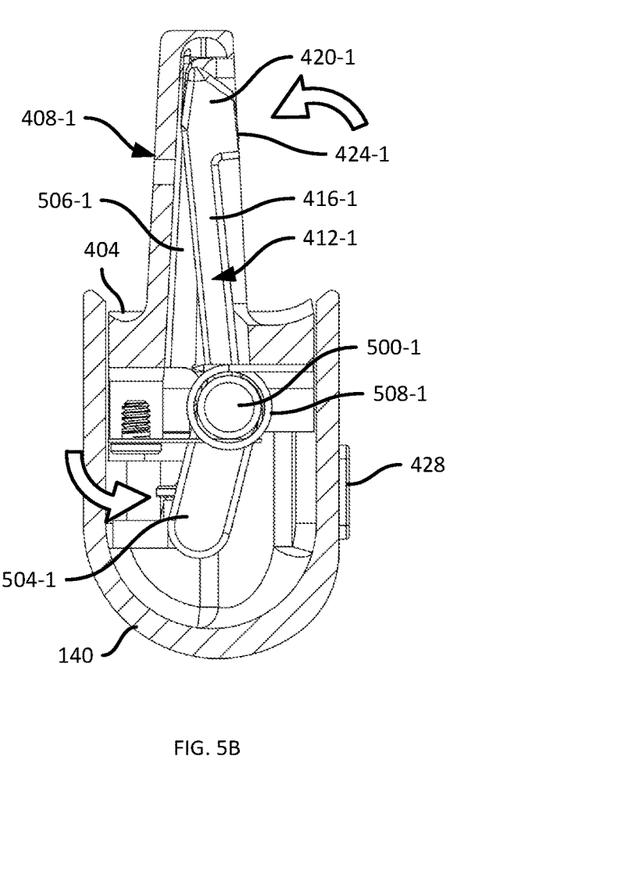
FIG. 5B is a cross section of the mounting mechanism of FIG. 4 in a retracted position.

Turning to FIG. 5A and FIG. 5B, cross sections of the mounting mechanism 128 are illustrated with the latch 412-1 in the engaged position (FIG. 5A) and in the retracted position (FIG. 5B). It will be understood that the latch 412-2 includes matching components and functionality to those discussed below in connection with the latch 412-1. The latch 412-1 is movably mounted within the mounting mechanism 128, e.g., by a latch axle 500-1. The axle 500-1, in this example, is integrated with the latch body 416-1 and is rotatably supported by internal walls of the mounting body 140. The latch 412-1 further includes an arm 504-1 extending from axle 500-1 into the mounting body 140. An actuator within the mounting body 140 (discussed below in connection with FIGS. 6A and 6B) is configured to rotate the arm 504-1 about the axle 500-1 between the position shown in FIG. 5A and the position shown in FIG. 5B. Because the arm 504-1, the axle 500-1, and the latch 412-1 are affixed to one another (e.g., being fabricated from a single piece of material), rotation of the arm 504-1 also rotates the latch body 416-1.

In the engaged position shown in FIG. 5A, the head 420-1 extends outwards from a channel 506-1 defined by the blade member 408-1. As will be apparent, when located within the slot 104-1 the head 420-1 in the illustrated position extends into the recess 316-1. The head 420-1 therefore prevents withdrawal of the latch 412-1 from the slot 104-1, which in turn prevents disconnection of the mounting mechanism 128 from the computing device 104.

As noted earlier, the magnet 424-1 biases the latch 412-1 towards the engaged position as the magnet 424-1 approaches the plate 320-1 (that is, as the blade member 408-1 and the latch 412-1 travel into the slot 304-1. In some examples, the mounting mechanism 128 can also include additional bias member(s) to bias the latches 412 towards the engaged position. For example, as shown in FIGS. 5A and 5B, the mounting mechanism 128 can include a torsion spring 508-1 (more generally, as with other components noted above, a torsion spring 508 for each latch 412) disposed to bias the latch 412 towards the engaged position, e.g., against an interior wall of the mounting body 140. In other examples, the torsion springs 508 can be omitted.

In the retracted position shown in FIG. 5B, the latch 412-1 and arm 504-1 have rotated about the axle 500 to move the latch body 416-1 and the head 420-1 into the channel 506-1. As illustrated, in the retracted position the head 420-1 no longer extends outside the channel 506-1, and therefore no longer obstructs withdrawal of the latch 412-1 from the slot 104-1. In other words, when the latch 412-1 is in the retracted position, the latch 412-1 and blade member 408-1 can be removed from the slot 104-1. When the latch 412-2 is also in the retracted position, the computing device 104 can therefore be separated from the mounting mechanism 128.

Figure 6A:
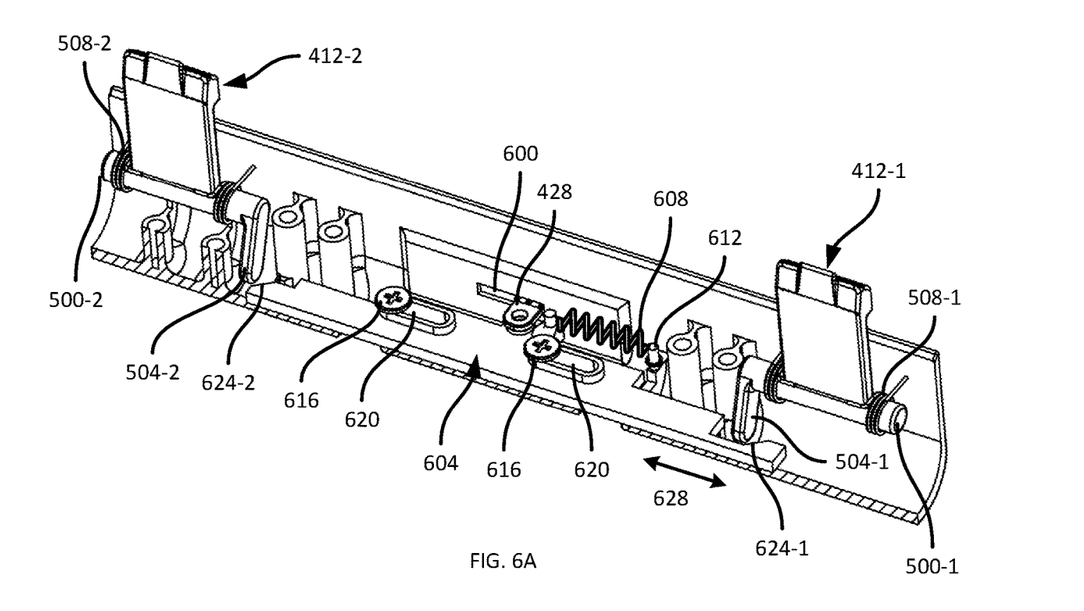
FIG. 6A is a partial sectional view of the mounting mechanism of FIG. 4 in the engaged position.
Figure 6B:
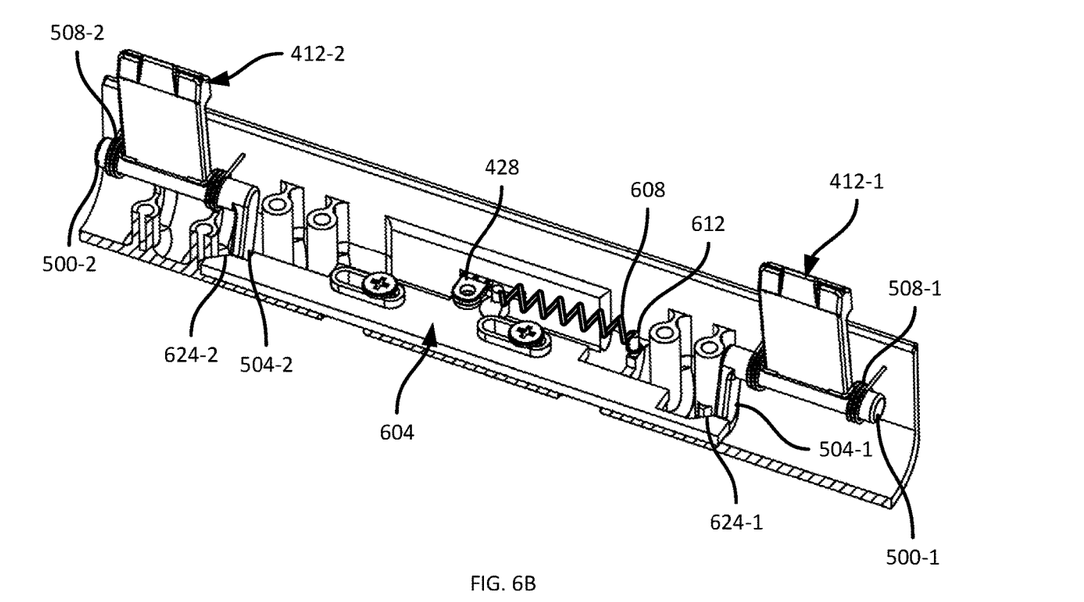
FIG. 6B is a partial sectional view of the mounting mechanism of FIG. 4 in the retracted position.

Turning to FIG. 6A and FIG. 6B, certain internal components of the mounting mechanism 128 configured to actuate the latches 412 are illustrated. In particular, a portion of the mounting body 140 carrying the blade members 408 and a portion of the U-shaped exterior wall of the body 140 as shown in FIGS. 5A and 5B is sectioned out in FIGS. 6A and 6B, to reveal an interior of the mounting body 140. The mounting body 140 includes an opening (e.g., a linear slot) 600 in a wall thereof, through which a tab of the slider 428 extends. The mounting body 140 also slidably supports a latch actuator 604, and the tab of the slider 428 is connected to the actuator 604, e.g., via a pin, screw, or other suitable fastener. Movement of the slider 428 therefore moves the actuator 604 between a neutral position (shown in FIG. 6A) and an unlocking position (shown in FIG. 6B). The actuator 604 can be biased towards the neutral position by a spring 608 connected between the actuator 604 and a post 612 integrated with an interior wall of the mounting body 140.

The actuator 604 can be coupled to an interior wall of the mounting body 140 by screws 616, posts, or the like extending through slots in the actuator 604. The slots 620, as well as the slot 600, define the range of motion of the actuator 604 (and the slider 428). The actuator 604 further includes cam surfaces 624-1 and 624-2 corresponding to the latches 412-1 and 412-2. The cam surfaces 624 are ramped surfaces in the illustrated example, having varying depths (measured perpendicularly to a direction of travel 628 of the actuator 604) from one end of the ramp to the other. As seen in FIG. 6A, when the actuator 604 is in the neutral position, the cam surfaces 624 do not engage with the arms 504 of the latches 412, and the latches 412 are therefore biased towards the engaged position, e.g., by either or both of the torsion springs 508 and the magnets 424. When the slider 428 is moved (to the left, from the viewpoint of FIGS. 6A and 6B), the actuator 604 is transitioned to the unlocking position shown in FIG. 6B, against the action of the spring 608. In the unlocking position, the cam surfaces 624 engage with the arms 504 and rotate the arms 504 about the axles 500, transitioning the latches 412 to the retracted position. Releasing the slider 428 allows the actuator 604 to return to the neutral position, e.g., via the action of the spring 608.

Installing the input assembly 116 onto the computing device therefore involves inserting the blade members 408 and latches 412 into the slots 304. Insertion of the latches 412 into the slots 304 pushes the latches 412 into the channels 506 (i.e. forcing the latches 412 into the retracted positions), until the heads 420 of the latches 412 reach the recesses 316. At that point the magnets 424 and/or springs 508 bias the latches 412 into the engaged positions, the heads 420 extend into the recesses 316, and the magnets 424 engage with the plates 320 (e.g., producing audible feedback confirming that the computing device 104 is fully seated on the mounting mechanism 128).

Figure 7:
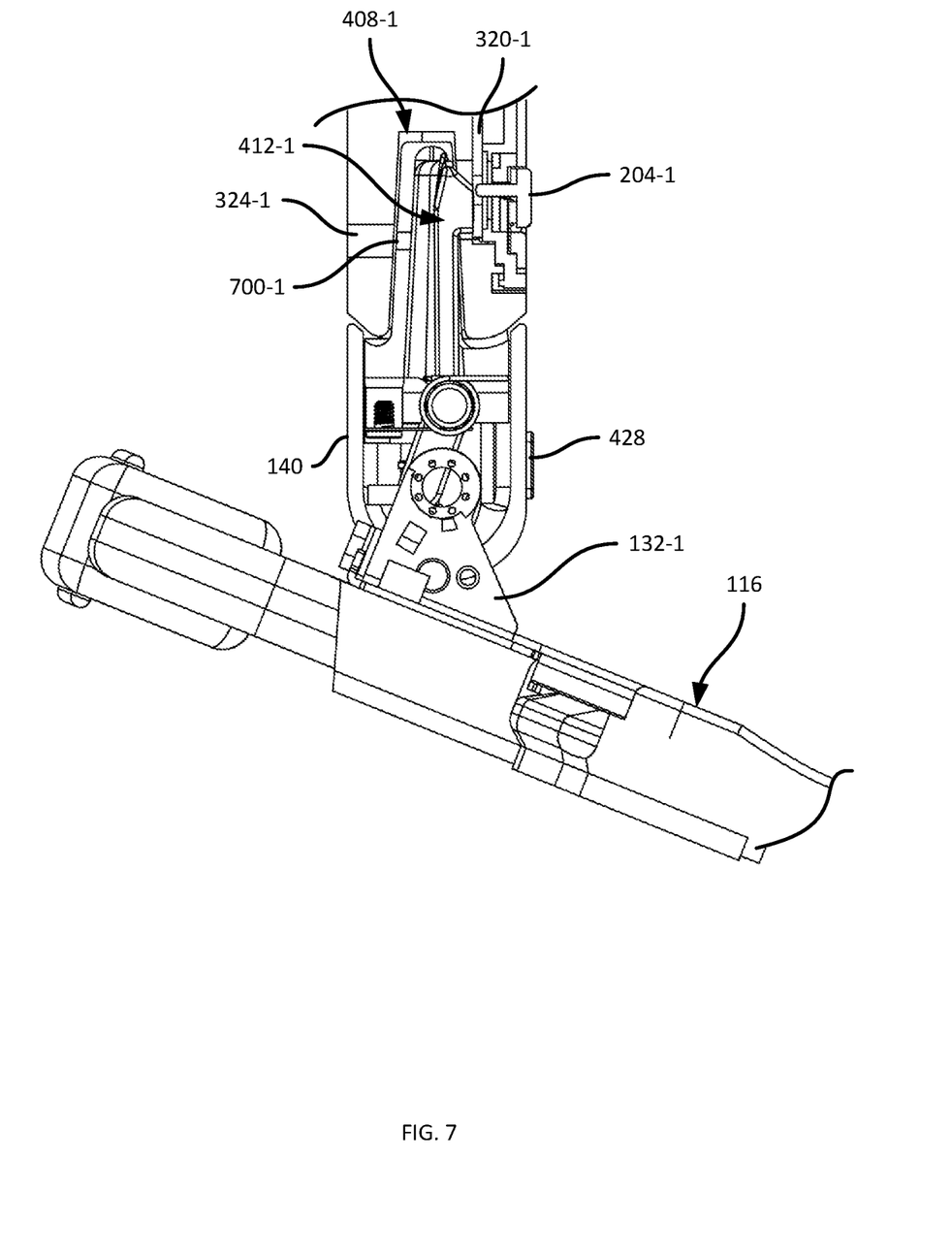
FIG. 7 is a partial cross section of the computing device and input assembly of FIG. 1.

FIG. 7 illustrates a partial cross section of the system 100 illustrating the blade member 408-1 and latch 412-1 inserted into the slot 304-1, with the latch 412-1 in the engaged position. As seen in FIG. 7, the latch 412-1 prevents disconnection of the computing device 104 from the input assembly 116, until the slider 428 is activated, or until the button 204-1 is depressed (which pushes the latch 412-1 back into the blade member 408-1).

Once the computing device 104 and the mounting mechanism 128 are coupled, the computing device 104 may be locked to the mounting mechanism 128, e.g., to prevent decoupling of the computing device 104 and the input assembly 116 in hazardous environments, by inserting a fastener such as a screw into the aperture 324-1. The blade member 408-1 can include a matching aperture 700-1 through which the fastener can extend, to abut against the latch 412-1, preventing the latch 412-1 from returning to the retracted position, even when the slider 428 and/or button 204-1 are manipulated.

Figure 8:
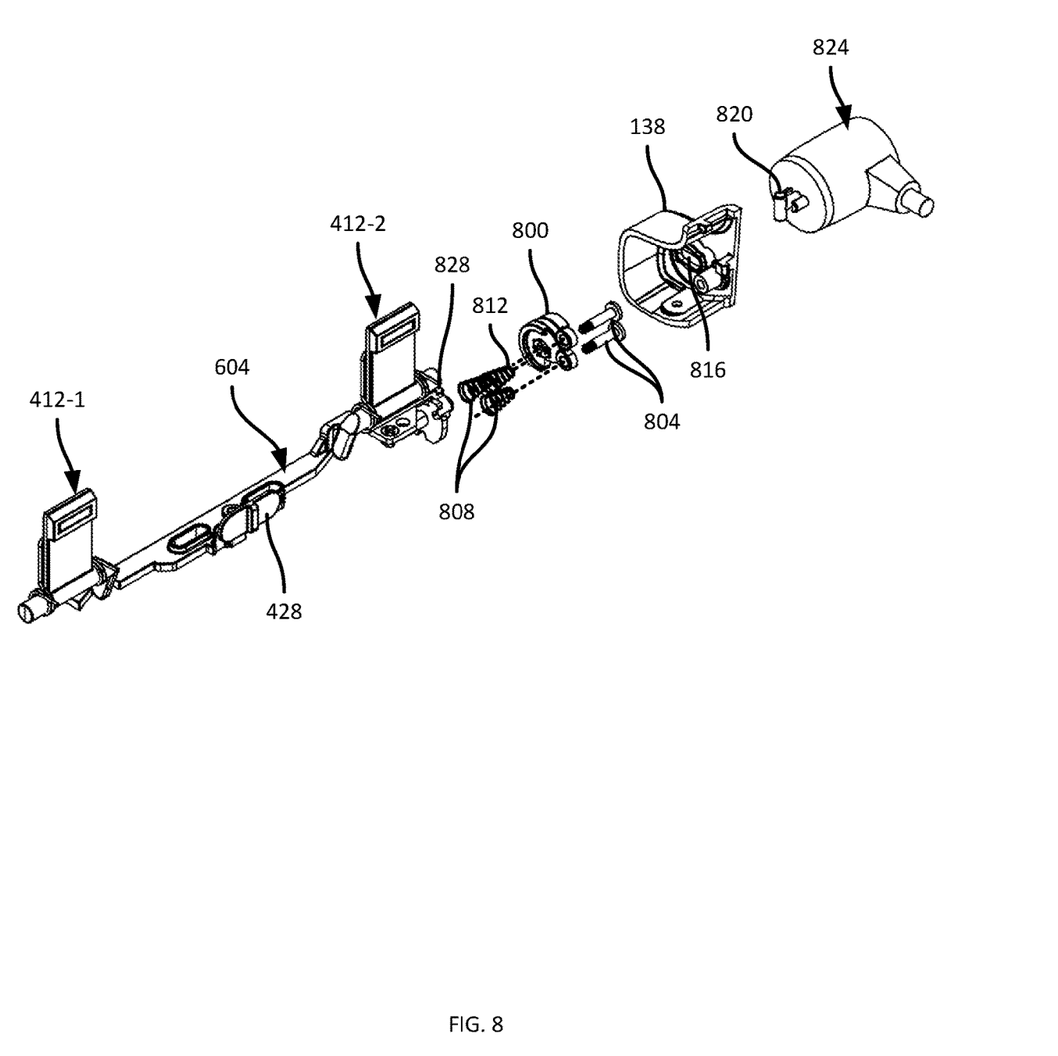
FIG. 8 is an exploded view of a portion of the mounting mechanism of FIG. 4 illustrating a locking assembly.

Turning to FIG. 8, the locking assembly housed in the portion 138 shown in FIG. 1 is illustrated. FIG. 8 illustrates a portion of the mounting mechanism 128 in an exploded view, along with the portion 138 of the input assembly 116 housing. The mounting mechanism 128 includes, in addition to the latches 412 and the actuator 604, a locking block 800 slidably mounted within the portion 138. For example, the block 800 can be slidably coupled to another portion of the input assembly 116 housing and/or the mounting body 140 by fasteners 804. The mounting mechanism 128 can also include compression springs 808 disposed on the fasteners 804, and biasing the block 800 away from the latches 412. In the illustrated example, the mounting mechanism 128 also includes a compression spring 812 disposed between the block 800 and a portion of the mounting body 140, also biasing the block 800 away from the latches 412.

The portion 138 includes a slot 816 configured to receive a rotatable bar 820 of a security slot lock 814. The bar 820 is rotatable between unlocked and locked (illustrated in FIG. 8) positions via insertion and rotation of a key in the body of the lock 824. When the bar 820 is inserted into the slot 816, the bar pushes the block 800 towards the latches 412, which prevents the actuator 604 from moving to the unlocking position mentioned earlier. Specifically, an end 828 of the actuator 604 abuts against the block 800 when the actuator 604 begins to move towards the unlocking position, prevent further movement of the actuator 604.

Figure 9A:
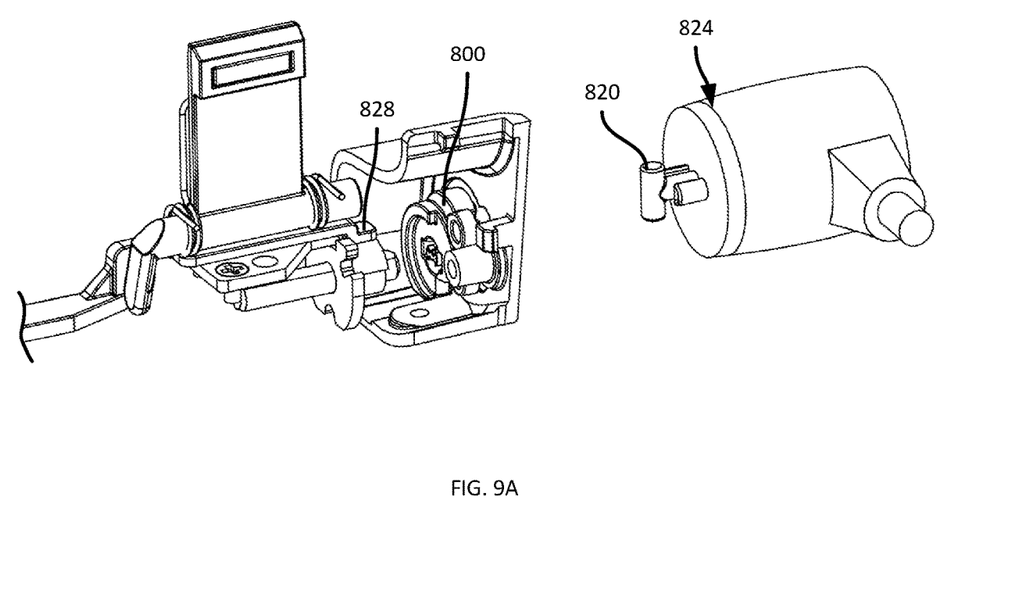
FIG. 9A is a partial view of the locking assembly of FIG. 8 in an unlocked position.
Figure 9B:
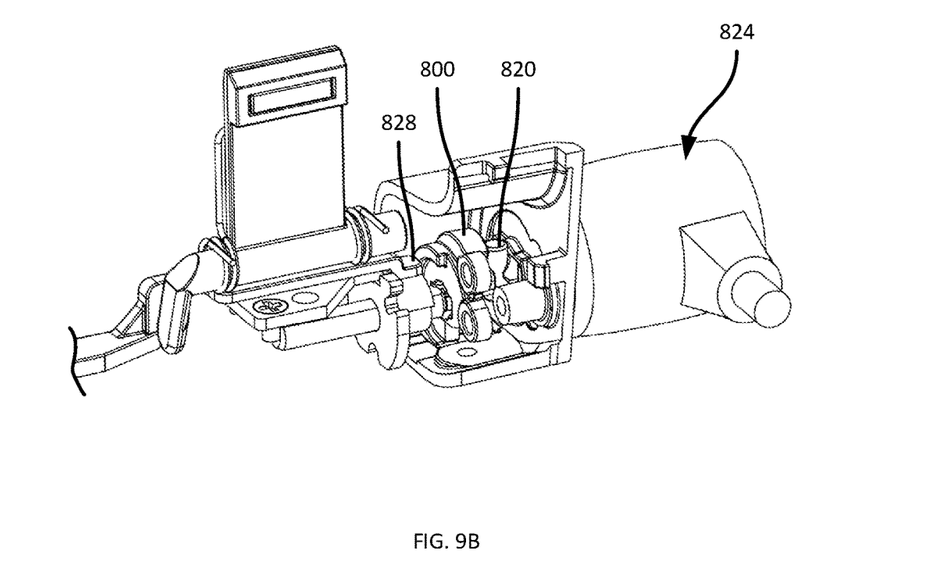
FIG. 9B is a partial view of the locking assembly of FIG. 8 in a locked position.

FIG. 9A illustrates a portion of the mounting mechanism 128, with the fasteners 804 and springs 808 and 812 omitted, and the block 800 in an unlocked position (as a result of the biasing effect of the springs 808 and 812. As shown in FIG. 9A, the path of the end 828 of the actuator 604 is unimpeded by the block 800, and the actuator 604 can therefore slide to the unlocking position. In FIG. 9B, the bar 820 has been inserted into the slot 816 and rotated (prevent withdrawal of the bar 820 from the slot 816). The block 800 has therefore been moved towards the end 828, and the range of motion of the actuator 604 is therefore sufficiently restricted as to prevent unlatching of the mounting mechanism 128 from the computing device 104.

In other embodiments, the mounting mechanism 128 as described above can be implemented to couple the computing device 104 with a variety of assemblies other than the input assembly 116. For example, the mounting mechanism 128 can be coupled to a carrying strap, or other suitable assembly, to releasably secure the computing device 104 to the carrying strap. A wide variety of other assemblies with which the mounting mechanism 128 can be implemented will also occur to those skilled in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An input assembly for a computing device, the input assembly comprising:
   an input device;
   a mounting body coupled to the input device;
   a blade member affixed to the mounting body, the blade member configured for insertion into a slot of the computing device, wherein the slot includes a transverse recess;
   a latch disposed within the blade member, the latch having a head carrying a magnet, the latch coupled to the mounting body movably between (i) an engaged position to place the head in the recess and obstruct withdrawal of the latch from the slot, and (ii) a retracted position to withdraw the head from the recess;
   a latch axle within the mounting body, configured to rotatably support the latch between the engaged and retracted positions, where the latch axle is substantially perpendicular to a longest dimension of the blade member; and
   wherein the latch is biased towards the engaged position via attraction between the magnet and a magnetic material of the transverse recess.

2. The input assembly of claim 1, wherein the input device comprises a keyboard.

3. The input assembly of claim 1, further comprising:
   an axle extending from an end of the mounting body, the axle defining an axis of rotation; and
   a connector coupling the input device to the mounting body rotatably about the axis of rotation.

4. The input assembly of claim 1, wherein the blade member is tapered from a proximal end affixed to the mounting body to a distal end.

5. The input assembly of claim 4, wherein the blade member includes a channel extending from the proximal end towards the distal end; and
   wherein the latch is disposed within the channel.

6. The input assembly of claim 1, wherein the latch includes:
   a latch body extending from the latch axle towards a distal end of the blade member, and an arm affixed to the latch body and extending within the mounting body from the latch axle;
   the mounting body further containing a latch actuator movable between (i) an unlocking position for displacing the arm to rotate the latch body to the retracted position, and (ii) a neutral position for permitting the arm and the latch body to rotate to the engaged position.

7. The input assembly of claim 6, wherein the latch actuator includes a ramped surface configured to engage with the arm in the unlocking position.

8. The input assembly of claim 6, further comprising:
   a slider on an outer surface of the mounting body and coupled to the latch actuator, the slider movable to transition the latch actuator between the unlocking position and the neutral position.

9. The input assembly of claim 6, wherein the latch actuator is biased towards the neutral position.

10. A system, comprising:
    a computing device including a housing, the housing defining a slot extending from an outer wall of the housing into the housing, the slot containing a transverse recess;
    an input assembly;
    a mounting body coupled to the input assembly;
    a blade member affixed to the mounting body, the blade member configured for insertion into the slot;
    a latch disposed within the blade member, the latch having a head carrying a magnet, the latch coupled to the mounting body movably between (i) an engaged position to place the head in the recess and obstruct withdrawal of the latch from the slot, and (ii) a retracted position to withdraw the head from the recess;
    a latch axle within the mounting body, configured to rotatably support the latch between the engaged and retracted positions, where the latch axle is substantially perpendicular to a longest dimension of the blade member; and
    wherein the latch is biased towards the engaged position via attraction between the magnet and a magnetic material of the transverse recess.

11. The system of claim 10, wherein the input device comprises a keyboard.

12. The system of claim 10, further comprising:
    an axle extending from an end of the mounting body, the axle defining an axis of rotation; and
    a connector coupling the input device to the mounting body rotatably about the axis of rotation.

13. The system of claim 10, wherein the blade member is tapered from a proximal end affixed to the mounting body to a distal end.

14. The system of claim 13, wherein the blade member includes a channel extending from the proximal end towards the distal end; and wherein the latch is disposed within the channel.

15. The system of claim 10, wherein the latch includes:

a latch body extending from the latch axle towards a distal end of the blade member, and an arm affixed to the latch body and extending within the mounting body from the latch axle;

the mounting body further containing a latch actuator movable between (i) an unlocking position for displacing the arm to rotate the latch body to the retracted position, and (ii) a neutral position for permitting the arm and the latch body to rotate to the engaged position.

16. The system of claim 15, wherein the latch actuator includes a ramped surface configured to engage with the arm in the unlocking position.

17. The system of claim 15, further comprising:

a slider on an outer surface of the mounting body and coupled to the latch actuator, the slider movable to transition the latch actuator between the unlocking position and the neutral position.

18. The system of claim 15, wherein the latch actuator is biased towards the neutral position.

19. The system of claim 10, further comprising:

a block slidably mounted adjacent to an end of the latch actuator, the block movable between (i) a locked position impeding movement of the latch actuator into the unlocking position, and (ii) an unlocked position permitting movement of the latch actuator into the unlocking position;

wherein the mounting body includes a slot configured to receive a bar of a security slot lock for moving the block into the locked position.

20. The system of claim 10, wherein engagement of the magnet with the recess generates audible feedback.

21. The system of claim 10, wherein the computing device further comprises a button extending from an outer surface of the housing towards the recess, and wherein depression of the button extends the button into the recess for moving the latch to the retracted position.

* * * * *